United States Patent
Mohiuddin et al.

(10) Patent No.: US 11,455,649 B2
(45) Date of Patent: Sep. 27, 2022

(54) DYNAMICALLY CHANGING A TAG'S DISPLAYED CONTENT RESPONSIVE TO AN INDIVIDUAL'S PROXIMITY THERETO

(71) Applicants: Mohammad Mohiuddin, Boynton Beach, FL (US); Hubert A. Patterson, Boca Raton, FL (US); Melwyn F. Sequeira, Plantation, FL (US)

(72) Inventors: Mohammad Mohiuddin, Boynton Beach, FL (US); Hubert A. Patterson, Boca Raton, FL (US); Melwyn F. Sequeira, Plantation, FL (US)

(73) Assignee: Sensormatic Electronics, LLC, Boca Raton, FL (US)

(*) Notice: Subject to any disclaimer, the term of this patent is extended or adjusted under 35 U.S.C. 154(b) by 570 days.

(21) Appl. No.: 15/833,183

(22) Filed: Dec. 6, 2017

(65) Prior Publication Data
US 2019/0172088 A1    Jun. 6, 2019

(51) Int. Cl.
G06Q 30/00 (2012.01)
G06Q 30/02 (2012.01)
G08B 13/24 (2006.01)
G06K 19/07 (2006.01)

(52) U.S. Cl.
CPC ..... *G06Q 30/0233* (2013.01); *G06K 19/0723* (2013.01); *G06Q 30/02* (2013.01); *G06Q 30/0226* (2013.01); *G08B 13/246* (2013.01)

(58) Field of Classification Search
CPC ........................................ G06Q 30/0207–0277
See application file for complete search history.

(56) References Cited

U.S. PATENT DOCUMENTS

| 7,063,263 | B2* | 6/2006 | Swartz ............... G06K 17/00 |
| | | | 235/462.45 |
| 2005/0234778 | A1* | 10/2005 | Sperduti ........... G06Q 20/3278 |
| | | | 705/22 |
| 2006/0131401 | A1 | 6/2006 | Do et al. |
| 2012/0075101 | A1* | 3/2012 | Austin ................. G01P 13/00 |
| | | | 340/572.1 |

(Continued)

FOREIGN PATENT DOCUMENTS

| EP | 2887343 A2 | 6/2015 |
| EP | 3200142 A1 | 8/2017 |
| WO | 2013153282 A1 | 10/2013 |

OTHER PUBLICATIONS

International Search Report issued in PCT/US2018/064108, dated Mar. 26, 2019.

*Primary Examiner* — Kambiz Abdi
*Assistant Examiner* — Christopher Stroud
(74) *Attorney, Agent, or Firm* — ArentFox Schiff LLP

(57) ABSTRACT

Systems and methods for dynamically changing displayed content of a tag coupled to an item. The methods comprising: detecting when an individual is in proximity to the tag; triggering operations, by a computing device remote from the tag, to obtain customer related information associated with the individual, when a detection is made that the individual is in proximity to the tag; determining, by the computing device, a price discount for the item based on the customer related information which was previously obtained; and dynamically changing the displayed content of the tag to include the price discount while the individual is still in proximity to the tag.

21 Claims, 8 Drawing Sheets

(56) References Cited

U.S. PATENT DOCUMENTS

| | | | |
|---|---|---|---|
| 2013/0128022 A1* | 5/2013 | Bose | H04N 7/18 |
| | | | 348/77 |
| 2015/0042540 A1 | 2/2015 | Goel et al. | |
| 2015/0356610 A1* | 12/2015 | Ponoth | G06Q 10/087 |
| | | | 705/14.58 |
| 2017/0124603 A1* | 5/2017 | Olson | G06Q 30/0277 |
| 2018/0006990 A1* | 1/2018 | Munemann | G06Q 50/01 |

* cited by examiner

DYNAMICALLY CHANGING A TAG'S DISPLAYED CONTENT RESPONSIVE TO AN INDIVIDUAL'S PROXIMITY THERETO

FIELD

This document relates generally to intelligence systems (e.g., for retail applications). More particularly, this document relates to implementing systems and methods for dynamically changing a tag's displayed content in response to a customer's proximity to the item to which the tag is coupled.

BACKGROUND

Targeted pricing is another way to increase sales and keep the loyal customers returning to the store. Newspaper inserts, mail in coupons, and email advertisements are few ways to keep the customer engaged. Many of these methods work only marginally for various reasons: no time to clip the coupon; forgetting the coupons when out for shopping; not paying attention to the emails or other forms of advertising.

SUMMARY

The present disclosure concerns implementing systems and methods for dynamically changing displayed content of a tag coupled to an item. The methods comprising: detecting when an individual is in proximity to the tag; triggering operations of a computing device remote from the tag to obtain customer related information associated with the individual, when a detection is made that the individual is in proximity to the tag; determining, by the computing device, a price discount for the item based on the customer related information which was previously obtained; and dynamically changing the displayed content of the tag to include the price discount while the individual is still in proximity to the tag.

In some scenarios, the tag comprises an Electronic Article Surveillance ("EAS") component. The customer related information includes, but is not limited to, a customer loyalty level for a rewards program offered by a business entity.

In those or other scenarios, the methods also comprise: communicating the price discount from the tag to the individual's mobile device (e.g., via a Near Field Communication ("NFC")); and outputting the price discount from the individual's mobile device. The outputting comprises dynamically changing displayed content of the individual's mobile device to include the price discount.

In those or other scenarios, the methods further comprise: performing operations by the computing device to push item level information for the item to the individual's mobile device; and outputting the item level information from the individual's mobile device. Additionally or alternatively, operations are performed to cause at least one of accessory information and related product information to be output from the tag and/or individual's mobile device. These operations can include, but are not limited to: identifying at least one first accessory for the item or at least one first related product that can be used in conjunction with or as an alternative to the item; obtaining information for the identified at least one first accessory or related product that is to be presented to the individual; and dynamically changing the displayed content of at least one of the tag and the individual's mobile device to include the information while the individual is still in proximity to the tag. The first accessory can be selected from a plurality of accessories based on the item's current location and the locations of the accessories. Similarly, the first related product can be selected from a plurality of related products based on the item's current location and the locations of the accessories.

The tag's location within a facility is monitored to detect when the tag's physical location changes. The displayed content is dynamically changed to include information for at least one second accessory or related product that is physically located closest to the tag's new physical location.

DESCRIPTION OF THE DRAWINGS

The present solution will be described with reference to the following drawing figures, in which like numerals represent like items throughout the figures.

DETAILED DESCRIPTION

Figure 1:
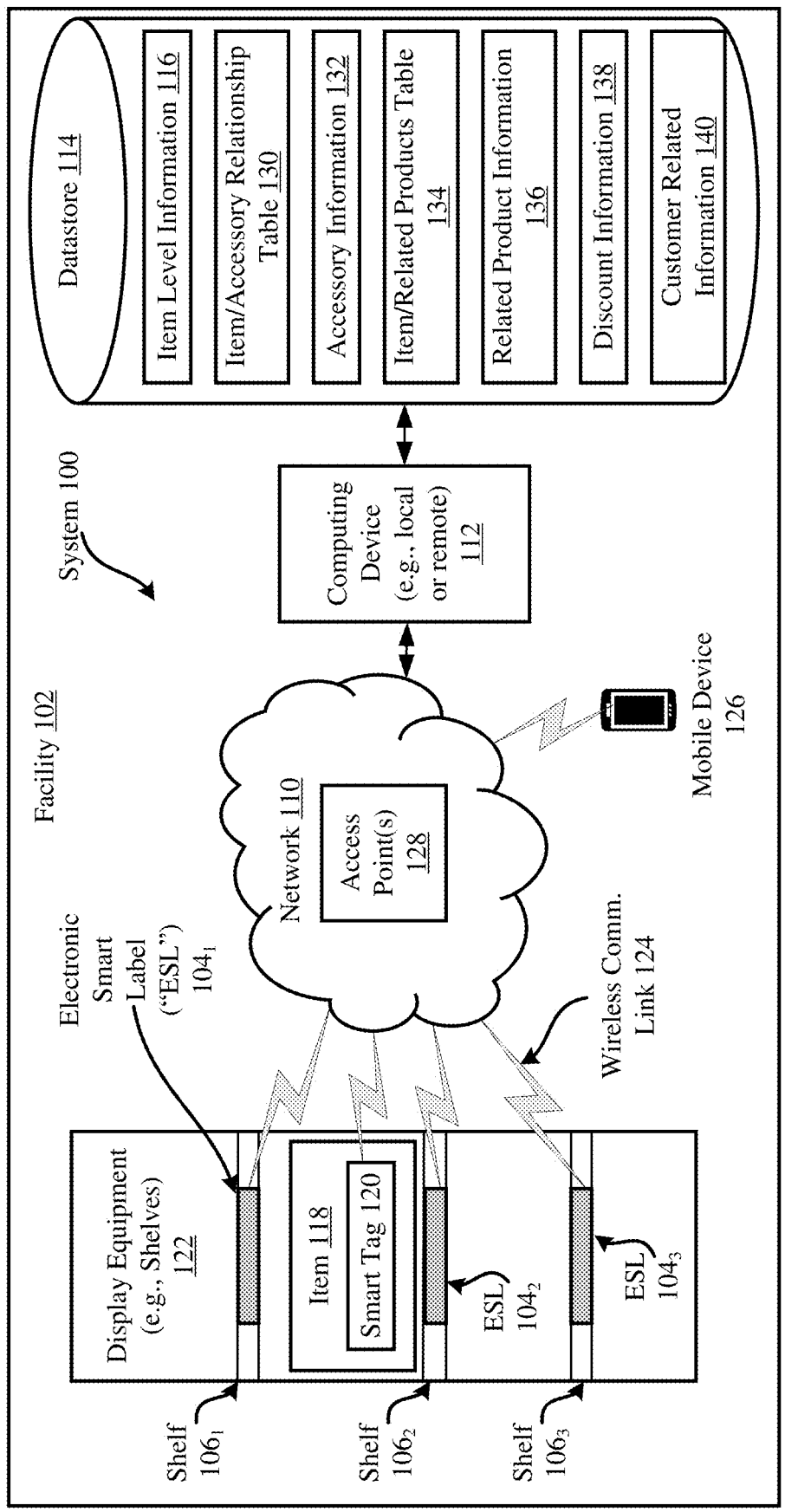
FIG. 1 is an illustration of an illustrative system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution generally concerns implementing systems and methods for dynamically changing a tag's displayed content in response to a customer's proximity to an item to which the tag is coupled. The methods generally involve: detecting when an individual (e.g., a customer) is in proximity to a tag; optionally communicating a message from the tag or the individual's mobile device to an enterprise system in response to the detection of the individual's presence; determining a loyalty level of the individual with a business entity; identifying any discount information for the item based on the loyalty level; optionally communicating the discount information to the tag and/or the individual's mobile device; and changing the displayed content of the tag and/or mobile device to include the received discount information associated with the item to which the tag is coupled.

The methods can additionally involve: identifying any accessories for the item to which the tag is coupled and/or related products that can be used in conjunction with or as an alternative to the item; obtaining information associated with the identified accessories and/or related products; optionally communicating the information to the tag and/or the individual's mobile device; and changing the displayed content of the tag and/or the individual's mobile device to include the received information associated with the identified accessories (e.g., accessory product information (product description and/or price), promotional information, and/or sale information) and/or related products (e.g., related product information (product description and/or price), promotional information, and/or sale information). An accessory includes, but is not limited to, a useful auxiliary item that can be attached to or removed from an item (e.g., a drill bit or battery of a drill). A related product includes, but is not limited to, a product that can be used in conjunction with or as an alternative to another product (e.g., diaper rash cream which can be used when changing a diaper, or a first diaper can be used as an alternative to another diaper).

The present solution can also use the current location of the tag to select the accessories and/or related products which are closest to the tag at any given time. As the tag travels through the store, different accessories and/or related products are selected. As such, information for different accessories and/or related products is displayed on the smart tag and/or mobile device at different times while the tag is traveling through the store. Thus, the tag and/or mobile device provides dynamically changing displayed content for improving an individual's shopping experience and/or increasing a retail store's overall sales.

Referring now to FIG. 1, there is provided an illustration of an illustrative system 100. System 100 is entirely or at least partially disposed within a facility 102. The facility 102 can include, but is not limited to, a manufacturer's facility, a distribution center facility, a retail store facility or other facility within a supply chain.

As shown in FIG. 1, at least one item 118 resides within the facility 102. The item 118 has a smart tag 120 coupled thereto. This coupling is achieved via an adhesive (e.g., glue, tape or sticker), a mechanical coupler (e.g., straps, clamps, snaps, etc.), a weld, chemical bond or other means. The smart tag 120 is generally configured to provide a visual and/or auditory output of item level information, accessory information, related product information, and/or discount information. The item level information includes, but is not limited to, an item description, item nutritional information, a promotional message, an item regular price, an item sale price, a currency symbol, and/or a source of the item. The accessory information includes, but is not limited to, an accessory description, accessory nutritional information, a promotional message, an accessory regular price, an accessory sale price, a currency symbol, a source of the accessory, and/or an accessory location in the facility. The related product information includes, but is not limited to, a related product description, related product nutritional information, a promotional message, a related product regular price, a related product sale price, a currency symbol, a source of the related product, and/or a related product location in the facility. The discount information includes, but is not limited to, a reduced price for an item.

The smart tag 120 will be described in detail below in relation to FIGS. 2-4. The item level information, accessory information, related product information and/or discount information can be output in a format selected from a plurality of formats based on a geographic location of the item, a date, and/or an item pricing status (e.g., whether the item is on sale). In a display context, the format is defined by a font parameter, a color parameter, a brightness parameter, and/or a display blinking parameter. In an auditory context, the format is defined by a volume parameter, a voice tone parameter, and/or a male/female voice selection parameter.

The item 118 is disposed on display equipment 122. The display equipment includes, but is not limited to, shelves $106_1$-$106_3$, display cabinets, and/or exhibit cases. In the shelf scenario, each shelf $106_1$-$106_3$ may have an Electronic Smart Label ("ESL") affixed thereto. ESLs are well known in the art, and therefore will not be described herein. Still, it should be understood that the ESLs display information relating to the items stored on the respective shelves. In some scenarios, the ESLs are connected to a corporate network via long-range radio technology. In this case, the ESLs may communicate with the smart tags via a short-range or long-range radio and provide informational updates thereto.

The smart tag 120 and ESLs $104_1$-$104_3$ comprise wireless communication components that enable the communication of item level information 116, accessory information 132, related product information 136, discount information 138 and/or customer related information 140 thereto and/or therefrom. The wireless communication components can implement one or more different types of communication technology. The communication technologies can include, but are not limited to, Radio Frequency ("RF") communication technology, Bluetooth technology, WiFi technology, Sub GHz technology, beacon technology, and/or LiFi technology. Each of the listed types of communication technology are well known in the art, and therefore will not be described herein.

The item level information 116, accessory information 132, related product information 136, discount information 138 and/or customer related information 140 is provided to the smart tag, ESLs and/or mobile device 126 from a computing device 112 via a network 110. The computing device 112 can be local to the facility 102 as shown in FIG. 1 or remote from the facility 102. The computing device 112 will be described in detail below in relation to FIG. 5. However, at this time, it should be understood that the computing device 112 is configured to: write data to and read data from a database 114, smart tag 120, ESLs $104_1$-$104_3$, and/or mobile device 126; and/or perform language and currency conversion operations using item level information and/or accessory information obtained from the database 114, smart tag 120, ESLs $104_1$1-$104_3$ and/or mobile device 126. The data can include, but is not limited to, item level information 116, accessory information 132, related product information 136, discount information 138 and/or customer related information 140.

Accordingly, the computing device 112 facilitates updates to the item level information, accessory information, related product information, and/or discount information output from the smart tags, ESLs and/or mobile devices. Such information updating can be performed periodically, in response to instructions received from an associate (e.g., a retail store employee), in response to a detected change in the item level, accessory and/or related product information, in response to a detection that an individual is in proximity to the smart tag or ESL, and/or in response to any motion or movement of the smart tag. For example, if a certain product is placed on sale, then the sale price for that product is transmitted to access point 128, which in turn transmits the sale price to each smart tag/ESL associated with that product. The sale price is then output from the smart tags/ESLs. The present solution is not limited to the particulars of this example.

The network 110 interconnects the computing device 112 with at least one access point 128. Network 110 can be a wired or wireless network facilitating communication between computing device 112 and the access point 128. The access point 128 receives the item level information 116, accessory information 132, related product information 136, discount information 138 and/or customer related information 140 from the computing device 112, optionally translates this information, and sends it to the smart tag 120, ESLs $104_1$1-$104_3$ and/or mobile device 126 via wireless communication links 124.

Although a single computing device 112 is shown in FIG. 1, the present solution is not limited in this regard. It is contemplated that more than one computing device can be implemented. Also, the present solution is not limited to the illustrative system architecture described in relation to FIG. 1. For example in other scenarios, the present solution is used in a system such as that disclosed in U.S. Patent Publication No. 2012/0326849 to Relihan et al. (incorporated herein by reference).

During operations of system 100, the content displayed on the display screens of the smart tags 120, ESLs $104_1$, . . . , $104_3$ and/or mobile devices 126 are dynamically controlled based upon various tag or item related information and/or customer related information (e.g., mobile device identifiers, mobile device locations in the facility, and/or customer loyalty levels). The tag or item related information, includes, but is not limited to, first information indicating that an individual is in proximity to the smart tag and/or ESL, second information indicating that the item 118 is being handled by an individual, third information indicating a current location of the smart tag 120, and/or fourth information identifying any accessories for the item 118. The first, second and third information can be derived based on sensor data generated by sensors local to the smart tag 120. Accordingly, the smart tag 120 comprises one or more sensors to detect its current location, detect any individuals in proximity thereto, and/or detect any motion or movement thereof. The sensors include, but are not limited to, an Inertial Measurement Unit ("IMU"), a vibration sensor, a light sensor, an accelerometer, a gyroscope, a proximity sensor, a microphone, and/or a beacon communications device. The fourth information can be stored local to the smart tag 120 or in a remote datastore 114 as accessory information 132. The manner in which the displayed content is dynamically changed will become more evident as the discussion progresses.

In some scenarios, the customer's mobile device 126 facilitates the computing device's 112 (a) detection of when the individual enters the facility 102, (b) tracking of the individual's movement throughout the facility 102, and/or (c) the detection of when the individual is in proximity to the item 118 to which the smart tag is coupled. Alternatively or additionally, a sensor embedded in the smart tag 120 detects when the individual is in proximity to and/or is handling the item 118 to which the smart tag is coupled, and notifies the computing device 112 and/or mobile device 126 of such detection.

When a detection is made that the individual is in proximity to the item, the computing device 112 obtains customer related information (such as a loyalty level) associated with the individual. This information can be obtained from the individual's mobile device 126 and/or a datastore 114. The customer related information is then used to retrieve discount information 138 for the item to which the smart tag 120 is coupled. The retrieved discount information is then communicated from the computing device 112 to the smart tag 120. The smart tag 120 can output the discount information in a visual format and/or an auditory format. Alternatively or additionally, the smart tag 120 prompts the individual to place the mobile device in contact therewith so that the discount information can be communicated to the mobile device via an NFC or other type of communication. The discount information is then output from the mobile device. Other information may also be communicated from the smart tag 120 to the mobile device 126. This other information can include, but is not limited to, item level information.

The smart tag 120 can also retrieve accessory information from a local memory or a remote datastore 114. For example, the item comprises a battery operated drill. In this case, the accessories include batteries, drill bits, and various other attachments that could be used with the drill. Accordingly, the accessory information includes identifiers, descriptions, pricing and/or locations of the listed accessories. The smart tag's display is then dynamically changed to include all or some of the accessory information (e.g., the display indicates that the drill takes 4 Y size batteries that are located in isle X of the facility, and that the individual will obtain a 20% price reduction if purchased today along with the drill). The accessory information may alternatively or additionally be communicated to the mobile device 126 for output therefrom. The present solution is not limited to the particulars of this example.

In those or other scenarios, a sensor embedded in the smart tag 120 detects when an individual is in proximity to and/or is handling the item 118 to which the smart tag is coupled. When such a detection is made, the smart tag 120 retrieves the item's unique identifier from its local memory, and wirelessly communicates the same to a remote computing device 112. The computing device 112 uses the item's unique identifier and the item/accessory relationship table 130 to determine if there are any accessories associated therewith. If no accessories exist for the item 118, the computing device 112 uses the item level information 116 to determine one or more characteristics of the item 118. For example, the item includes diapers of a specific size and/or brand. The computing device then uses the item/related products table 134 to identify: (1) other diapers of the same size and/or brand with different characteristics (e.g., diapers of the same size and/or brand which are available (a) in an extra absorbent material for nighttime, (b) with aloe for sensitive skin, and (c) with various printed boy and/or girl patterns); and/or (2) other products which are typically used in conjunction with diapers (e.g., diaper rash cream and/or wipes). Related product information 136 for the identified related products is then retrieved by the computing device 112, and sent to the smart tag 120 for display thereby. The related product information is then output from the smart tag 120 or communicated to the mobile device 126 for output therefrom. The individual can perform user-software interactions with the smart tag and/or mobile device to obtain further information about a related product of interest. The present solution is not limited to the particulars of this example.

Figure 2:
FIG. 2 is an illustration of an exemplary Electronic Smart Tag ("EST").

Referring now to FIG. 2, there is an illustration of an exemplary EST 200 displaying item level information. An exemplary architecture for the EST 200 is provided in FIGS. 3-4. Smart tag 120 and/or ESLs 104₁1-104₃ of FIG. 1 is/are the same as or substantially similar to EST 200. As such, the discussion of EST 200 is sufficient for understanding the smart tag 120 and/or ESLs 104₁1-104₃ of FIG. 1.

Figure 3:
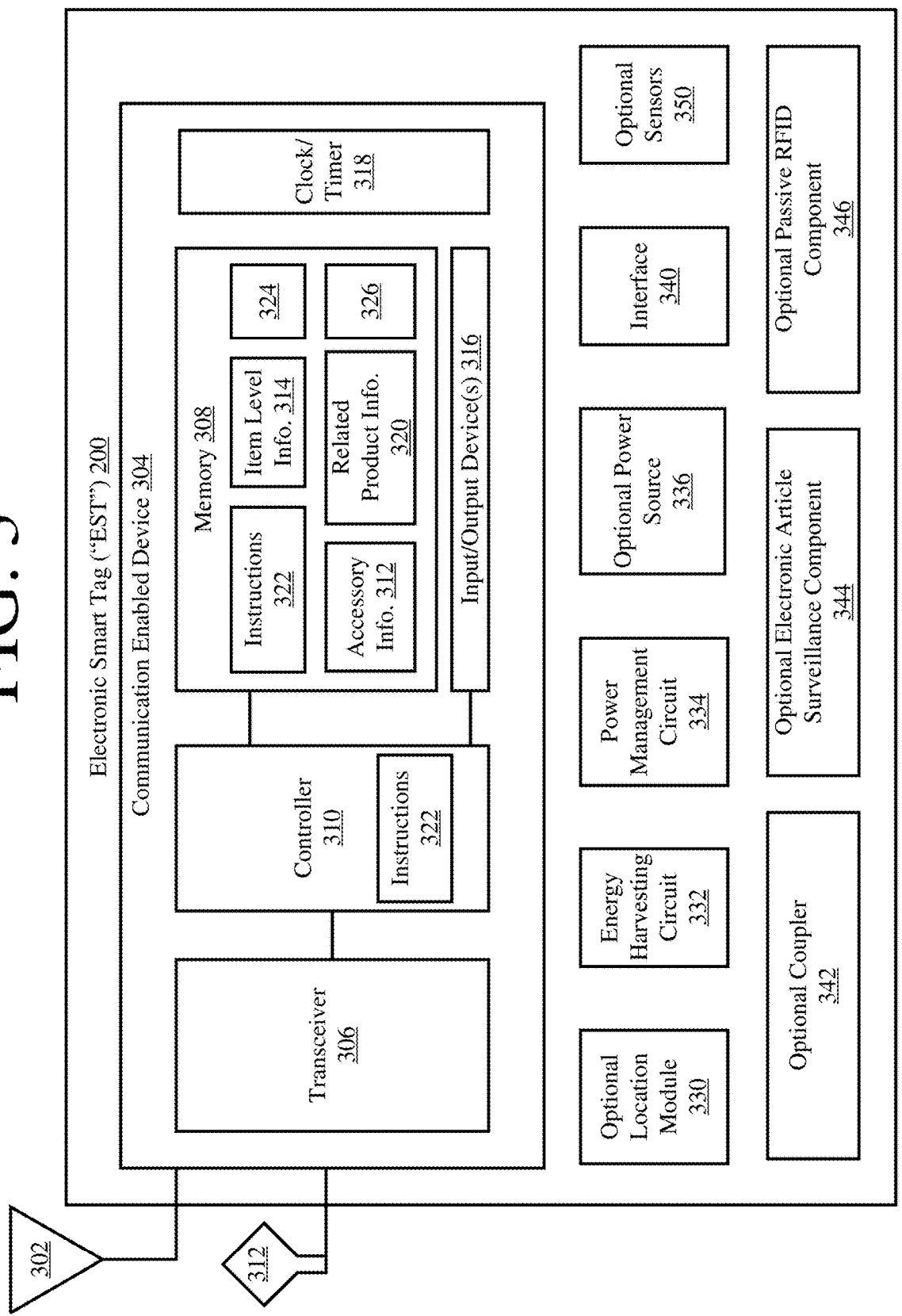
FIG. 3 is a block diagram of an illustrative architecture for the EST of FIG. 2.

The EST 200 can include more or less components than that shown in FIG. 3. However, the components shown are sufficient to disclose an illustrative embodiment implementing the present solution. Some or all of the components of the EST 200 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The hardware architecture of FIG. 3 represents a representative EST 200 configured to facilitate improved inventory management, merchandise sales, and/or customer experience. In this regard, the EST 200 is configured for allowing data to be exchanged with an external device (e.g., computing device 112 of FIG. 1) via wireless communication technology. The wireless communication technology can include, but is not limited to, a Radio Frequency Identification ("RFID") technology, an NFC technology, and/or a Short Range Communication ("SRC") technology. For example, one or more of the following wireless communication technologies (is) are employed: Radio Frequency ("RF") communication technology; Bluetooth technology; WiFi technology; Sub-GHz technology; beacon technology; and/or LiFi technology. Each of the listed wireless communication technologies is well known in the art, and therefore will not be described in detail herein. Any known or to be known wireless communication technology or other wireless communication technology can be used herein without limitation.

The components 306-318 shown in FIG. 3 may be collectively referred to herein as a communication enabled device 304, and include a memory 308 and a clock/timer 318. Memory 308 may be a volatile memory and/or a non-volatile memory. For example, the memory 308 can include, but is not limited to, Random Access Memory ("RAM"), Dynamic RAM ("DRAM"), Static RAM ("SRAM"), Read Only Memory ("ROM") and flash memory. The memory 308 may also comprise unsecure memory and/or secure memory.

In some scenarios, the communication enabled device 304 comprises a Software Defined Radio ("SDR"). SDRs are well known in the art, and therefore will not be described in detail herein. However, it should be noted that the SDR can be programmatically assigned any communication protocol that is chosen by a user (e.g., RFID, WiFi, LiFi, Bluetooth, BLE, Nest, ZWave, Zigbee, etc.). The communication protocols are part of the device's firmware and reside in memory 308. Notably, the communication protocols can be downloaded to the device at any given time. The initial/default role (being an RFID, WiFi, LiFi, etc. tag) can be assigned at the deployment thereof. If the user desires to use another protocol at a later time, the user can remotely change the communication protocol of the deployed EST 200. The update of the firmware, in case of issues, can also be performed remotely.

As shown in FIG. 3, the communication enabled device 304 comprises at least one antenna 302, 312 for allowing data to be exchanged with the external device via a wireless communication technology (e.g., an RFID technology, an NFC technology and/or a SRC technology). The antenna 302, 312 is configured to receive signals from the external device and/or transmit signals generated by the communication enabled device 304. In some scenarios, the antenna 302, 312 comprises a near-field or far-field antenna. The antennas includes, but are not limited to, a chip antenna or a loop antenna.

The communication enabled device 304 also comprises a transceiver 306. Transceivers are well known in the art, and therefore will not be described herein. However, it should be understood that the transceiver 306 generates and transmits signals (e.g., RF carrier signals) to external devices, as well as receives signals (e.g., RF signals) transmitted from external devices. In this way, the communication enabled device 304 facilitates the registration, identification, location and/or tracking of an item (e.g., item 118 of FIG. 1) to which the EST 200 is coupled. The communication enabled device 304 also facilitates the automatic and dynamic modification of item level information, accessory information, related product information, and/or discount information that is being or is to be output from the EST 200 in response to certain trigger events. The trigger events can include, but are not limited to, the EST's arrival at a particular facility (e.g., facility 102 of FIG. 1), the EST's arrival in a particular country or geographic region, a date occurrence, a time occurrence, a price change, the reception of user instructions, the detection of an individual in proximity to an item (e.g., item 118 of FIG. 1) to which the EST is coupled, and/or the detection motion/movement of an item (e.g., item 118 of FIG. 1) to which the EST is coupled.

Item level information 314, accessory information 312, related product information 320, discount information 324, and/or other information 326 associated with the identification, location and/or motion/movement of the EST 200 can be stored in memory 308 of the communication enabled device 304 and/or communicated to other external devices (e.g., computing device 112 of FIG. 1 and/or mobile device 126 of FIG. 1) via transceiver 306 and/or interface 340 (e.g., an Internet Protocol or cellular network interface). For example, the communication enabled device 304 can communicate information specifying a timestamp, a unique identifier, item description, item price, a currency symbol, a price discount, location information, and/or motion/movement information to an external computing device. The external computing device (e.g., server) can then store the information in a datastore (e.g., datastore 114 of FIG. 1) and/or use the information during language and/or currency conversion operations and/or during tag display change operations.

The communication enabled device 304 also comprises a controller (or processor circuit) 310 and input/output devices 316. The controller 310 can also execute instructions 322 implementing methods for facilitating item inventorying, merchandise sales and/or customer satisfaction. In this regard, the controller 310 includes a processor (or logic circuitry that responds to instructions) and the memory 308 includes a computer-readable storage medium on which is stored one or more sets of instructions 322 (e.g., software code) configured to implement one or more of the methodologies, procedures, or functions described herein. The instructions 322 can also reside, completely or at least partially, within the controller 310 during execution thereof by the EST 200. The memory 308 and the controller 310 also can constitute machine-readable media. The term "machine-readable media", as used here, refers to a single medium or multiple media (e.g., a centralized or distributed database, and/or associated caches and servers) that store the one or more sets of instructions 322. The term "machine-readable media", as used here, also refers to any medium that is capable of storing, encoding or carrying a set of instructions 322 for execution by the EST 200 and that cause the EST 200 to perform any one or more of the methodologies of the present disclosure.

The input/output devices can include, but are not limited to, a display (e.g., an E Ink display, an LCD display and/or an active matrix display), a speaker, a keypad and/or light emitting diodes. The display is used to present item level information, accessory information, related product information, and/or discount information in a textual format and/or graphical format. Similarly, the speaker may be used to output item level information, accessory information, related product information, and/or discount information in an auditory format. The speaker and/or light emitting diodes may be used to output alerts for drawing a person's attention to the EST 200 and/or for notifying the person of a particular pricing status (e.g., on sale status) of the item to which the EST is coupled.

The clock/timer 318 is configured to determine a date, a time, and/or an expiration of a pre-defined period of time. Technique for determining these listed items are well known in the art, and therefore will not be described herein. Any known or to be known technique for determining these listed items can be used herein without limitation.

The EST 200 also comprises an optional location module 330. The location module 330 is generally configured to determine the geographic location of the EST at any given time. For example, in some scenarios, the location module 330 employs Global Positioning System ("GPS") technology and/or Internet based local time acquisition technology. The present solution is not limited to the particulars of this example. Any known or to be known technique for determining a geographic location can be used herein without limitation.

The optional coupler 342 is provided to securely or removably couple the EST 200 to an item (e.g., item 118 of FIG. 1). The coupler 342 includes, but is not limited to, a mechanical coupling means (e.g., a strap, clip, clamp, snap) and/or adhesive (e.g., glue or sticker). The coupler 342 is optional since the coupling can be achieved via a weld and/or chemical bond.

The EST 200 can also include an optional power source (e.g., a rechargeable battery 336), an optional Electronic Article Surveillance ("EAS") component 344, and/or an operational passive/active/semi-passive RFID component 346. Each of the listed optional components 336, 344, 346 is well known in the art, and therefore will not be described herein. Any known or to be known power source (e.g., battery), EAS component and/or RFID component can be used herein without limitation.

As shown in FIG. 2, the EST 200 further comprises an energy harvesting circuit 332 and a power management circuit 334 for ensuring continuous operation of the EST 200 without the need to change a battery. In some scenarios, the energy harvesting circuit 302 is configured to harvest energy from one or more sources (e.g., heat, light, vibration, magnetic field, and/or RF energy) and to generate a relatively low amount of output power from the harvested energy. By employing multiple sources for harvesting, the device can continue to charge despite the depletion of a source of energy.

The energy harvesting circuit 332 can operate in two (2) ways. First, the energy harvesting circuit 332 can harvest energy from an available source while online (i.e., when the EST 200 is attached to merchandise). Second, the energy harvesting circuit 332 can harvest energy while offline (i.e., when the EST 200 is detached from merchandise) via a charging station/bin. This ensures that the EST 200 is fully charged when the EST is ready to be deployed or go online.

The energy harvesting circuit 332 can also be supplemented with bigger harvesters and/or a mains power source. In this case, the energy harvesting circuit 332 can be placed closer to its primary source (e.g., a solar panel on top of a shelf) and power from there can be distributed over two (2) wires. The design allows multiple labels to be connected to a single harvester circuit. The harvester circuit can be replaces with the mains power source.

The EST 200 may also include optional sensors 350 employing environmental and proximity sensing technology. The sensors 350 can include, but are not limited to, a light sensor, a fluid/liquid/humidity sensor, an IR detector, a camera, a proximity sensor, an IMU, an accelerometer, a gyroscope, and/or an RF detection unit. The input/output devices 316 (e.g., the display) can be turned off when a person is not located in proximity thereto. This capability is useful when the input/output devices 316 (e.g., the display) is not considered low power.

The power management circuit 334 is generally configured to control the supply of power to components of the EST 200. In the event all of the storage and harvesting resources deplete to a point where the EST 200 is about to enter a shutdown/brownout state, the power management circuit 334 can cause an alert to be sent from the EST 200 to a remote device (e.g., computing device 112 of FIG. 1). In response to the alert, the remote device can inform an associate (e.g., a store employee) so that (s)he can investigate why the EST 200 is not recharging and/or holding charge.

The power management circuit 334 is also capable of redirecting an energy source to the EST's 200 electronics based on the energy source's status. For example, if harvested energy is sufficient to run the EST's 200 function, the power management circuit 334 confirms that all of the EST's 200 storage sources are fully charged such that the EST's 200 electronic components can be run directly from the harvested energy. This ensures that the EST 200 always has stored energy in case harvesting source(s) disappear or lesser energy is harvested for reasons such as drop in RF, light or vibration power levels. If a sudden drop in any of the energy sources is detected, the power management circuit 334 can cause an alert condition to be sent from the EST 200 to the remote device (e.g., computing device 112 of FIG. 1). At this point, an investigation may be required as to what caused this alarm. Accordingly, the remote device can inform the associate (e.g., a store employee) so that (s)he can investigate the issue. It may be that other merchandise are obscuring the harvesting source or the item is being stolen.

Figure 4:
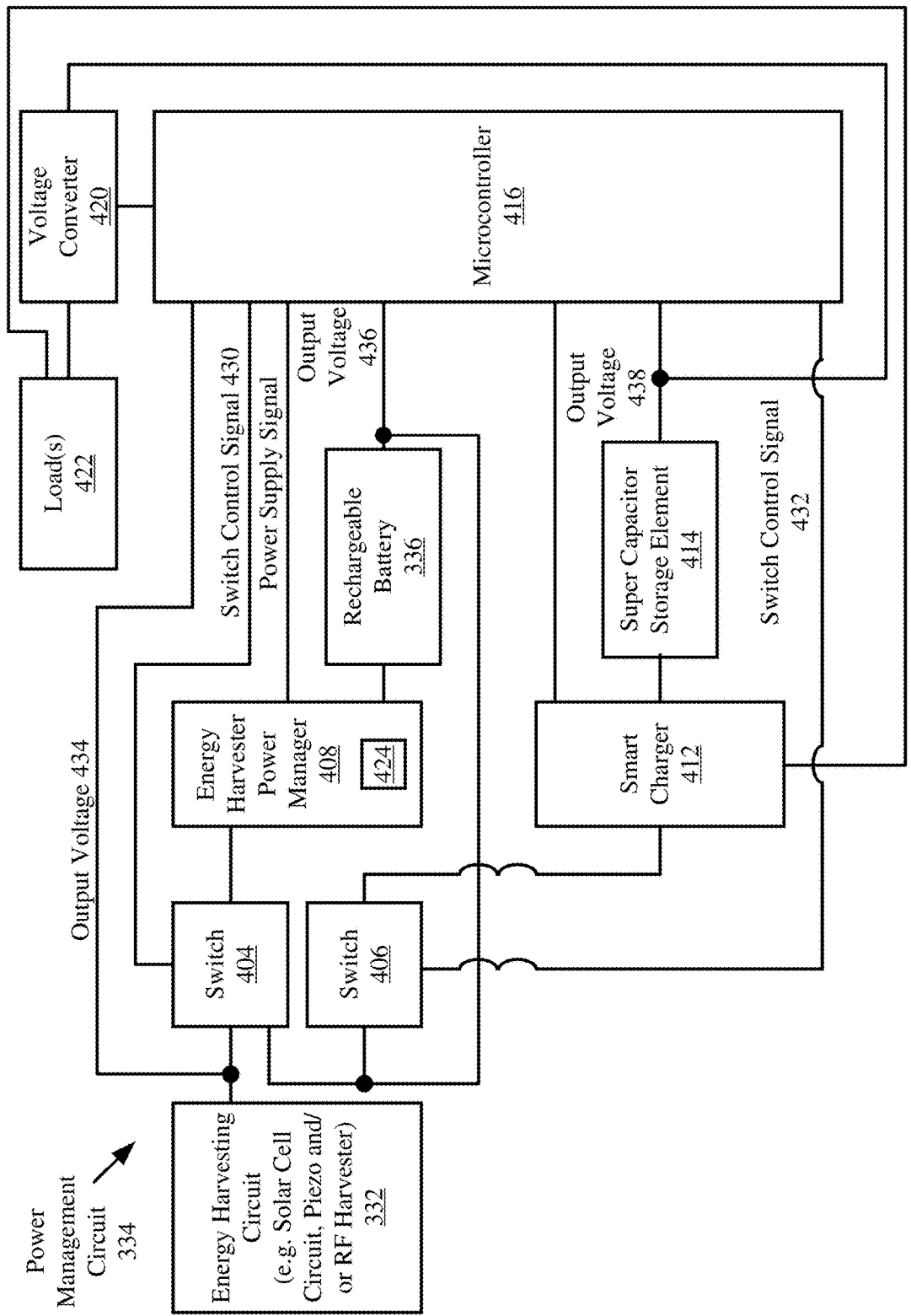
FIG. 4 is a block diagram of an illustrative architecture for a power management circuit of the EST of FIGS. 2-3.

Referring now to FIG. 4, there is provided a block diagram of an exemplary architecture 400 for the power management circuit 334 of the EST 200. The power management circuit 334 is not limited to the particular architecture shown in FIG. 4. In this regard, it should be understood that that power management circuit 334 can include more or less components than that shown in FIG. 4.

The power management circuit 334 is configured to provide a way in which the EST 200 is: deployable as a plug-n-play energy harvested wireless sensor that is ready to function as soon as it is turned on; and a self-sustaining sensor system wherein its power source would virtually never need to be replaced. In this regard, the power management circuit 334 is electrically connected to the energy harvesting circuit 332 and the optional power source (e.g., rechargeable battery) 336. The power management circuit 334 comprises switches 404, 406, an Energy Harvester Power Manager ("EHPM") 408, a Super Capacitor ("SC") storage element 414, a smart charger 412 for the SC storage element, a microcontroller 416, and a DC-DC voltage converter 420 electrically connected to a load(s) 422. The microcontroller 416 can be the same as or separate/distinct from the controller 310 of FIG. 3. The load 422 can include, but is not limited to, components 304, 330, 340, 350, 344 and/or 346 of FIG. 3.

In some scenarios, the energy harvesting circuit 332 comprises a solar cell circuit. The present solution is not limited in this regard. Other types of energy harvesting circuits can be used herein that generate a relatively low amount of output power.

At initial power up of the EST 200, the SC storage element 414 is assumed to be in a completely discharged state. Thus, the initial charge of the SC storage element 414 is at a level of approximately or substantially equal to zero volts. However, the power source (e.g., rechargeable battery) 336 is in a quasi-discharged state in which its initial charge is at a level greater than zero volts (e.g., 3 volts). As such, the power source (e.g., rechargeable battery) 336 has a sufficient amount of initial stored energy to nearly instantaneously enable operations of the control electronics of the EST 200. In this regard, an output voltage 436 is supplied from the power source (e.g., rechargeable battery) 336 to the EHPM 408 via switch 404, whereby operations of boost converters 424 contained in the EHPM 408 are started immediately after turning on the EST 200. The output voltage 436 is also supplied from the power source (e.g., rechargeable battery) 336 to the microcontroller 416 via the EHPM 408.

The available power from power source (e.g., rechargeable battery) is also used at this time to charge the SC storage element 414. In this regard, the output voltage 436 of the power source (e.g., rechargeable battery) 336 is supplied to the SC storage element 414 via switch 406 and smart charger 412, whereby charging of the SC storage element is expedited. An output voltage 438 of the SC storage element is supplied to the load(s) 422 via the voltage converter 420. The EST 200 is considered fully operational when the output voltage 438 reaches a level (e.g., 3.8 V) that is sufficient to cause the load(s) to perform the intended operations thereof.

Throughout operation of the EST 200, the microcontroller 416 monitors the output voltage 434 of the solar cell circuit 402, as well as the output voltage 436 of the power source (e.g., rechargeable battery) and the output voltage 438 of the SC storage element 414. Once the output voltage 438 of the SC storage element 414 reaches a desired voltage (e.g., 3.8 V) after system activation (or powering on), the microcontroller 416 enables a timer to time the charging of the SC storage element 414. After a pre-determined time period (e.g., 6 hours), an assumption is made that the SC storage element 414 has reached its leakage current equilibrium, and therefore no longer needs to be charged. In effect, the microcontroller 416 may optionally perform operations at this time to terminate the supply of output voltage 436 to the SC storage element 414 via switch 406 and smart charger 412.

When the output voltage 438 of the SC storage element 414 falls below a threshold value (e.g., 3.3 V), the microcontroller 416 communicates a switch control signal 432 to switch 406 so as cause the output voltage 436 of the power source (e.g., rechargeable battery) 410 to once again be supplied to the SC storage element 414 via the smart charger 412. Output voltage 436 is supplied to the SC storage element 414 until the output voltage 438 thereof exceeds an upper threshold value. In effect, the SC storage element 414 is recharged whereby the energy expended while driving load(s) 422 is(are) restored.

When the solar cell circuit 402 is active, the output voltage 434 of the solar cell circuit 402 is supplied to the power source (e.g., rechargeable battery) 336 via EHPM 408. In effect, the power source (e.g., rechargeable battery) 336 is recharged by the solar cell circuit 402, whereby the energy expended in charging and re-charging the SC storage element 414 is restored while the EST 200 is maintained in its fully operational state.

The above described process of using the power source (e.g., rechargeable battery) 336 to charge the SC storage element 414 is repeated as needed. Thus, the above described EST 200 performs self-monitoring and charges its respective re-chargeable elements throughout its entire operation.

Figure 5:
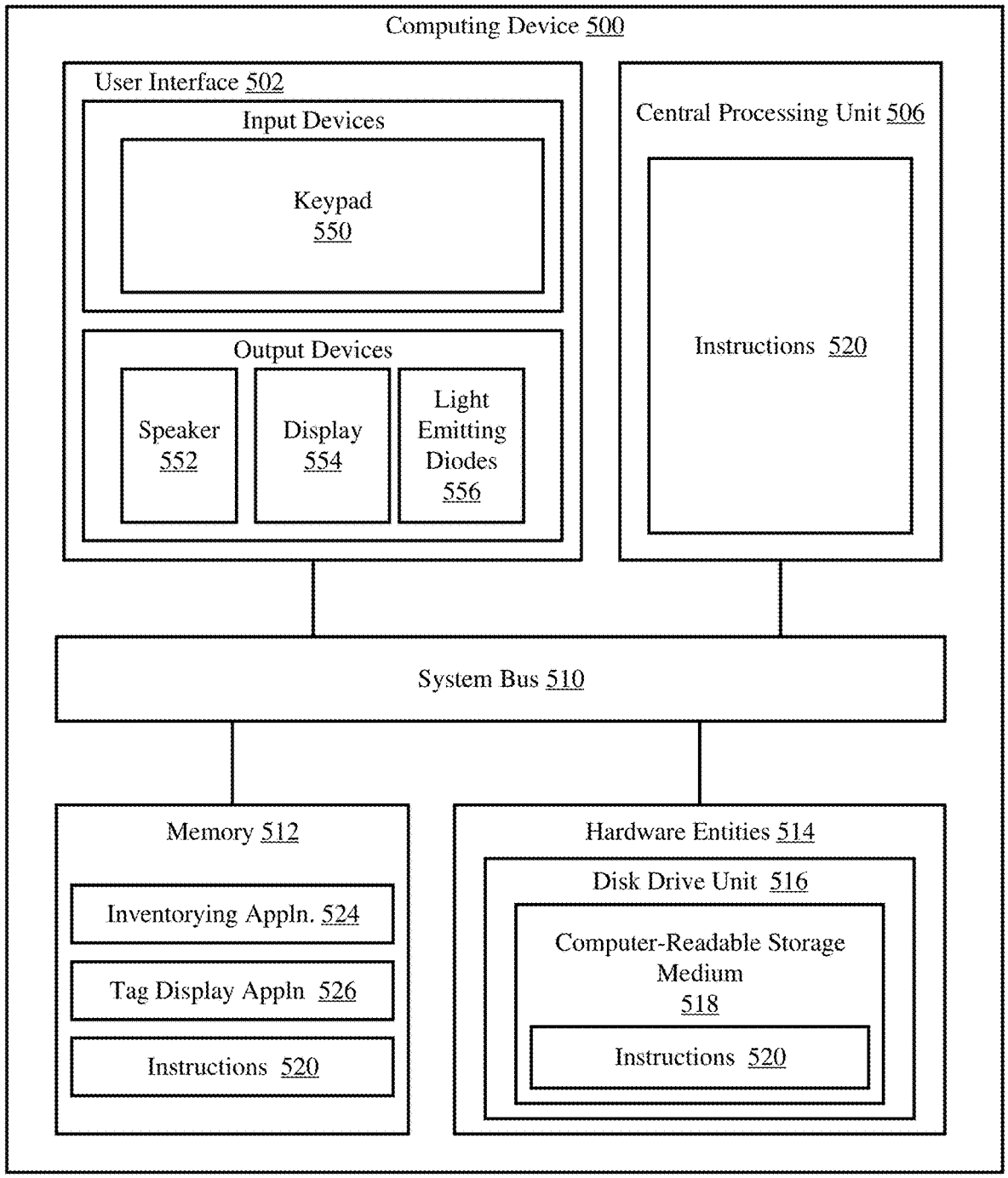
FIG. 5 is a block diagram of an illustrative architecture for a computing device.

Referring now to FIG. 5, there is provided a detailed block diagram of an exemplary architecture for a computing device 500. Computing device 112 of FIG. 1 and/or mobile device 126 of FIG. 1 is/are the same as or similar to computing device 500. As such, the following discussion of computing device 500 is sufficient for understanding computing device 112 and/or mobile device 126.

Computing device 500 may include more or less components than those shown in FIG. 5. However, the components shown are sufficient to disclose an illustrative embodiment implementing the present solution. The hardware architecture of FIG. 5 represents one embodiment of a representative Computing device configured to facilitate improved inventory pricing management and customer shopping experience. As such, the computing device 500 of FIG. 5 implements at least a portion of a method for automatically and dynamically modifying item level information, accessory information, related product information, and/or discount information output from smart tags, ESLs and/or mobile devices in accordance with the present solution.

Some or all the components of the computing device 500 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 5, the computing device 500 comprises a user interface 502, a Central Processing Unit ("CPU") 506, a system bus 510, a memory 512 connected to and accessible by other portions of computing device 500 through system bus 510, and hardware entities 514 connected to system bus 510. The user interface can include input devices (e.g., a keypad 550) and output devices (e.g., speaker 552, a display 554, and/or light emitting diodes 556), which facilitate user-software interactions for controlling operations of the computing device 500.

At least some of the hardware entities 514 perform actions involving access to and use of memory 512, which can be a RAM, a disk driver and/or a Compact Disc Read Only Memory ("CD-ROM"). Hardware entities 514 can include a disk drive unit 516 comprising a computer-readable storage medium 518 on which is stored one or more sets of instructions 320 (e.g., software code) configured to implement one or more of the methodologies, procedures, or functions described herein. The instructions 520 can also reside, completely or at least partially, within the memory 512 and/or within the CPU 506 during execution thereof by the computing device 500. The memory 512 and the CPU 506 also can constitute machine-readable media. The term "machine-readable media", as used here, refers to a single medium or multiple media (e.g., a centralized or distributed database, and/or associated caches and servers) that store the one or more sets of instructions 520. The term "machine-readable media", as used here, also refers to any medium that is capable of storing, encoding or carrying a set of instructions 320 for execution by the computing device 500 and that cause the computing device 500 to perform any one or more of the methodologies of the present disclosure.

In some scenarios, the hardware entities 514 include an electronic circuit (e.g., a processor) programmed for facilitating item inventorying, merchandise sales, and/or customer satisfaction with a shopping experience. In this regard, it should be understood that the electronic circuit can access and run an inventorying application 524 and a tag display application 526 installed on the computing device 500. The software applications 524-526 are collectively generally operative to: obtain item level information and/or other information from smart tags and/or ESLs; program item level information, accessory information, related product information and/or discount information onto smart tags and/or ESLs; convert the language, pricing and/or currency symbol of item level information, accessory information, related product information and/or discount information; facilitate registration of smart tags and/or ESLs with enterprise systems; and/or determine when tag display update actions need to be taken based on smart tag information. Other functions of the software applications 524-526 will become apparent as the discussion progresses.

Figure 6:
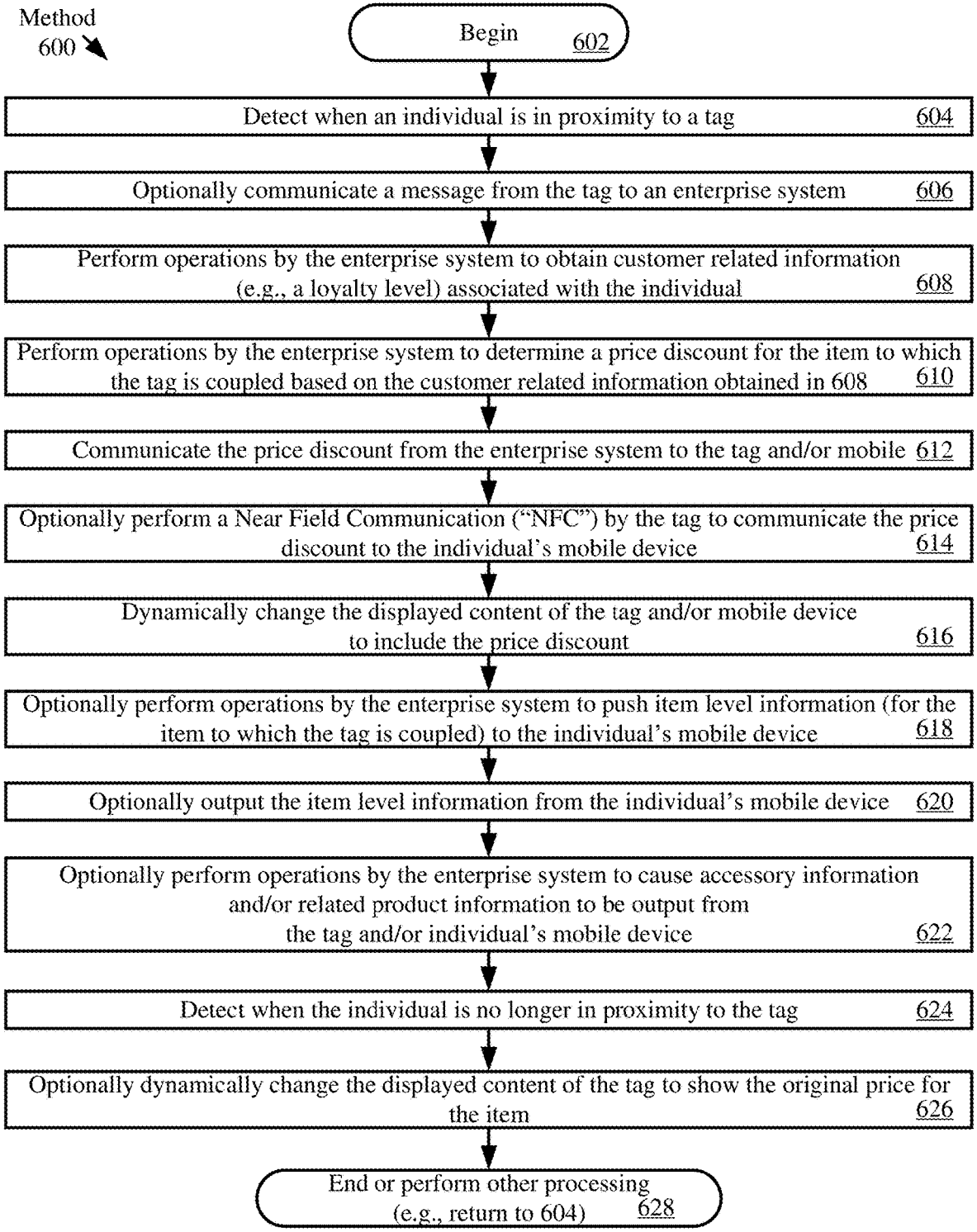
FIG. 6 is a flow diagram of an illustrative method for dynamically changing displayed content of a tag and/or mobile device.

Referring now to FIG. 6, there is provided a flow diagram of an illustrative method 600 for dynamically changing displayed content of a tag (e.g., smart tag 120 of FIG. 1 or 200 of FIGS. 2-3) and/or mobile device. Method 600 comprises operations performed in blocks 602-624. The present solution is not limited to the particular order in which the operations of blocks 602-624 are performed in FIG. 6. The location of one or more of the blocks of FIG. 6 can be changed.

As shown in FIG. 6, method 600 begins with 602 and continues with 604 where a detection is made by the tag (e.g., smart tag 120 of FIG. 1 or 200 of FIGS. 2-3) and/or an enterprise system (e.g., computing device 112 of FIG. 1). In some scenarios, sensor data is generated by one or more sensors (e.g., sensors 350 of FIG. 3) local to the tag. The sensor data is then analyzed to detect when an individual is in proximity to the tag and/or when an item (to which the tag is coupled) is being handled by the individual. Techniques for analyzing sensor data are well known in the art, and therefore will not be described herein. Any known or to be known sensor data analysis technique can be used herein without limitation. In other scenarios, the detection is made by the enterprise system (a) using triangulation or another technique (e.g., by the tag's internal location module (e.g., location module 330 of FIG. 3) to determine a current location of the tag, (b) using current location information wirelessly received from the mobile device, and (c) analyzing the tag's current location and the mobile device's current location to determine if a distance therebetween is equal to or less than a threshold value (e.g., 2-3 feet). If the distance is equal to or less than the threshold value, then a conclusion is made that the mobile device is in proximity to the tag. If the tag determines that the mobile device is in proximity thereto (rather than the enterprise system), then optional 606 is performed where a message is communicated from the tag to the enterprise system (e.g., computing device 112 of FIG. 1).

In 608, enterprise system operations are triggered when a detection is made that the individual is in proximity to the tag. These operations are performed to obtain customer related information (e.g., customer related information 140 of FIG. 1) associated with the individual. The customer related information can be indexed using a unique account identifier and/or a unique identifier of the individual's mobile device. The customer related information obtained in 608 can include, but is not limited to, a customer loyalty level for a rewards program offered by a business entity. The rewards program gives customer's advanced access to new products and/or services, as well as customized price discounts. In this regard, the enterprise system performs operations in 610 to determine a price discount for the item (e.g., item 118 of FIG. 1 which may include a pair of shoes) to which the tag is coupled. The price discount is determined based on the customer related information (e.g., the customer loyalty level) obtained in 608. For example, a Look-Up Table ("LUT") is used to look-up a price discount associated with a customer loyalty level. Alternatively, the customer loyalty level is used to compute a price discount using a pre-defined algorithm. The present solution is not limited to the particulars of this example.

The price discount is communicated in 612 from the enterprise system to the tag. In some scenarios, the enterprise system additionally or alternatively communicates the price discount to the individual's mobile device. For example, if the enterprise system determines that a single individual is located in proximity to the tag, then the price discount is only sent to the tag. However, if the enterprise system determines that there are two or more individuals located in proximity to the tag, then further operations are performed to determine if the individuals are associated with the same customer account. If so, then the price discount is sent to the tag. If not, then the enterprise system determines if the individuals have the same loyalty level or price discount. If so, then the price discount is sent to the tag. If not, the different price discounts are sent to the respective individual's mobile device rather than to the tag. This avoids issues arising when two individual's with different customized price discounts are located in proximity to the tag. The present solution is not limited to the particulars of this example.

In the case that the price discount is only communicated from the enterprise system to the tag, the price discount may optionally also be communicated from the tag to the individual's mobile device via an NFC (or any other suitable communications technique), as shown by 614. Next in 616, the displayed content of the tag and/or mobile device is dynamically changed to include the price discount. Additionally or alternatively, an auditory output of the tag and/or mobile device is dynamically changed in accordance with the price discount.

In some scenarios, the price discount is stored on the individual's mobile device such that the same can be later communicated to a Point Of Sale ("POS") station for purposes of verifying a purchase price of the item. This avoids issues arising when the price further changes between the time the item is picked-up from display equipment and the time the item arrives at the POS station for purchase. It also avoids issues arising when a customer remembers a different discount price at the display equipment than that which is being charged.

In those or other scenarios, the enterprise system also optionally pushes item level information (for the item to which the tag is coupled) to the individual's mobile device. In turn, the item level information is output from the mobile device (e.g., as a push notification), as shown by 620. The enterprise system may further optionally cause accessory information and/or related product information to be output from the tag and/or the individual's mobile device. An illustrative process for causing accessory information and/or related product information to be output is shown in FIG. 7, which will be described below.

Upon completing 616, 620 or 622, method 600 continues with 624 where a detection is made that the individual is no longer in proximity to the tag. In response to this detection, operations of 626 may be performed when the price discount is displayed on the tag. 626 involves dynamically changing the displayed content of the tag to show the original price for the item. Subsequently, 624 is performed where method 600 ends or other processing is performed (e.g., method 600 returns to 604).

Referring now to FIG. 7, there is provided a flow diagram of an illustrative method 700 for dynamically changing displayed content of a tag (e.g., smart tag 120 of FIG. 1 or 200 of FIGS. 2-3) and/or mobile device (e.g., mobile device 126 of FIG. 1). Method 700 comprises operations performed in blocks 702-654. The present solution is not limited to the particular order in which the operations of blocks 702-794 are performed in FIG. 7. The location of one or more of the blocks of FIG. 7 can be changed. Method 700 can be performed in 622 of FIG. 6.

Figure 7A:
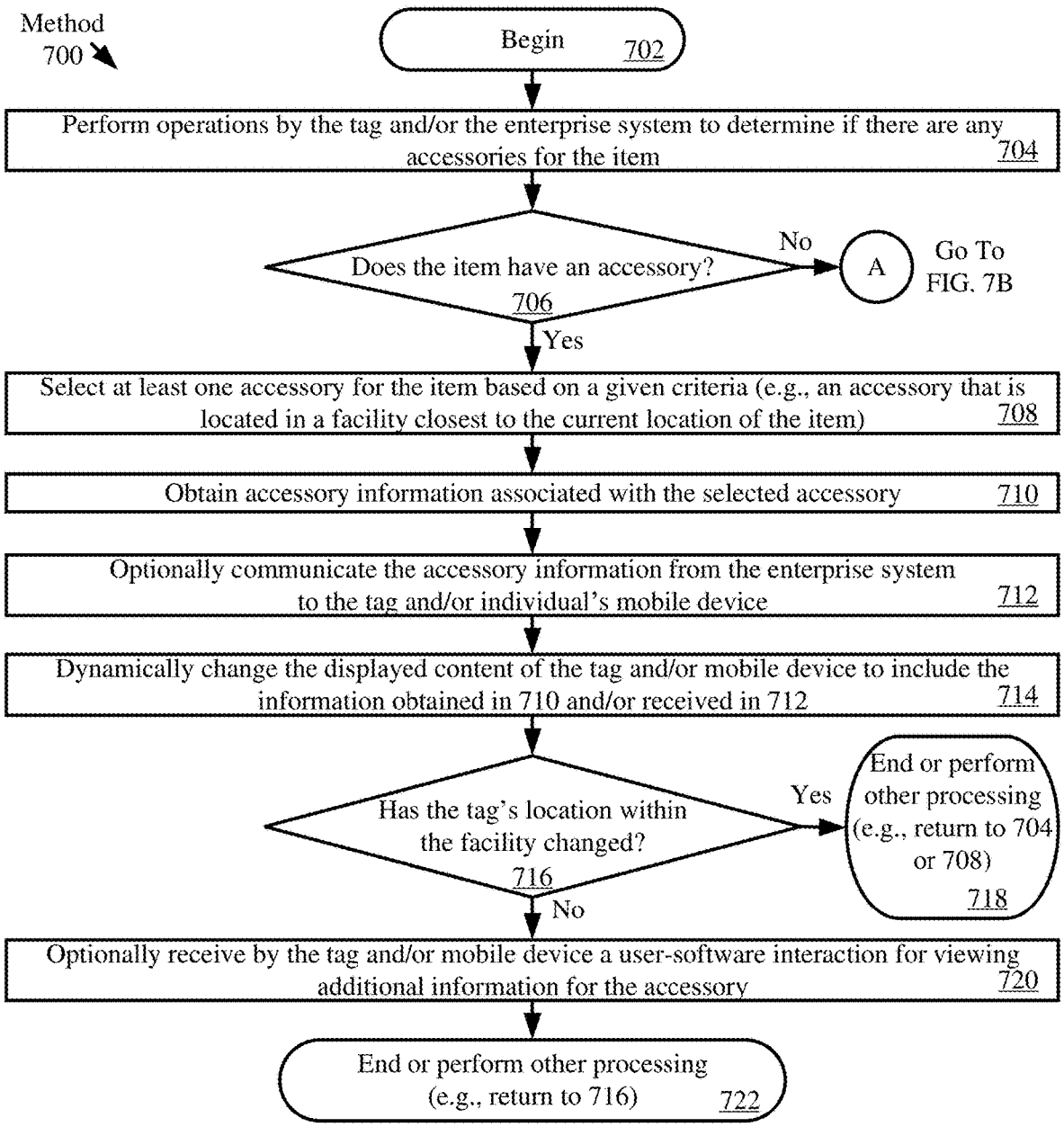
FIGS. 7A-7B (collectively referred to herein as "FIG. 7") provide a flow diagram of an illustrative method for dynamically changing displayed content of a tag and/or mobile device.

As shown in FIG. 7A, method 700 begins with 702 and continues with 704 where operations are performed by the tag and/or the enterprise system (e.g., computing device 112 of FIG. 1) to determine if there are any accessories for the item (e.g., item 118 of FIG. 1). An item/accessory relationship table (e.g., table 130 of FIG. 1) can be used in 704. The item/accessory relationship table can be stored in the tag's local memory and/or in a remote datastore (e.g., datastore 114 of FIG. 1). In some scenarios, the item/accessory relationship table comprises entries respectively associating item unique identifiers with accessory unique identifiers. If at least one accessory unique identifier is associated with the item's unique identifier in the item/accessory relationship table, then a determination is made that the item has an accessory. In contrast, if there are no accessory unique identifiers associated with the item's unique identifier in the item/accessory relationship table, then a determination is made that the item does not have an accessory.

If the item does not have any accessories [706:NO], then method 700 continues with 724-744 of FIG. 7B in which operations are performed for dynamically changing the tag's displayed content and/or the mobile device's displayed content to include information for any related products. 724-744 will be discussed below in detail.

If the item does have one or more accessories [706:YES], then method 700 continues with 708 where at least one accessory is selected for the item based on a given criteria. For example, an accessory is selected from a plurality of accessories since it is located closest to the tag. The tag's current location, the item/accessory relationship table, and/or accessory information (e.g., accessory information 132 of FIG. 1) are used in this scenario to make the selection. The present solution is not limited in to the particulars of this example. Accessory information (e.g., accessory information 132 of FIG. 1) associated with the selected accessory is obtained in 710. 710 can involve obtaining accessory information for the selected accessory from a memory local to the tag (e.g., memory 308 of FIG. 3) and/or a remote datastore (e.g., datastore 114 of FIG. 1). Accordingly, the accessory information can be communicated from the enterprise system to the tag and/or the individual's mobile device in some scenarios, as shown by optional 712. In other scenarios, the accessory information is (a) first communicated from the enterprise system to the tag, and (b) then from the tag to the mobile device via an NFC communication. Next in 714, the displayed content of the tag and/or mobile device is dynamically changed to include the accessory information.

Thereafter, the tag's location is monitored (e.g., by the tag's location module 330 of FIG. 3). If the tag's location within the facility has changed [716:YES], then 718 is performed where method 700 ends or other processing is performed (e.g., return to 704 or 708 of FIG. 7A). In contrast, if the tag's location within the facility has not changed [716:NO], then 720 is performed where the tag and/or mobile device optionally receives a user-software interaction for viewing additional information for the accessory. In response to the user-software interaction, the tag and/or mobile device can obtain and display the additional information for the accessory. The additional information can be obtained by the tag from a local memory (e.g., memory 308 of FIG. 3) and/or a remote datastore (e.g., datastore 114 of FIG. 1). The mobile device can obtain the additional information from the tag via an NFC communication and/or from the remote datastore via a computing device (e.g., computing device 112 of FIG. 1). Subsequently, 722 is performed where method 700 ends or other processing is performed (e.g., return to 716 of FIG. 7A).

Figure 7B:
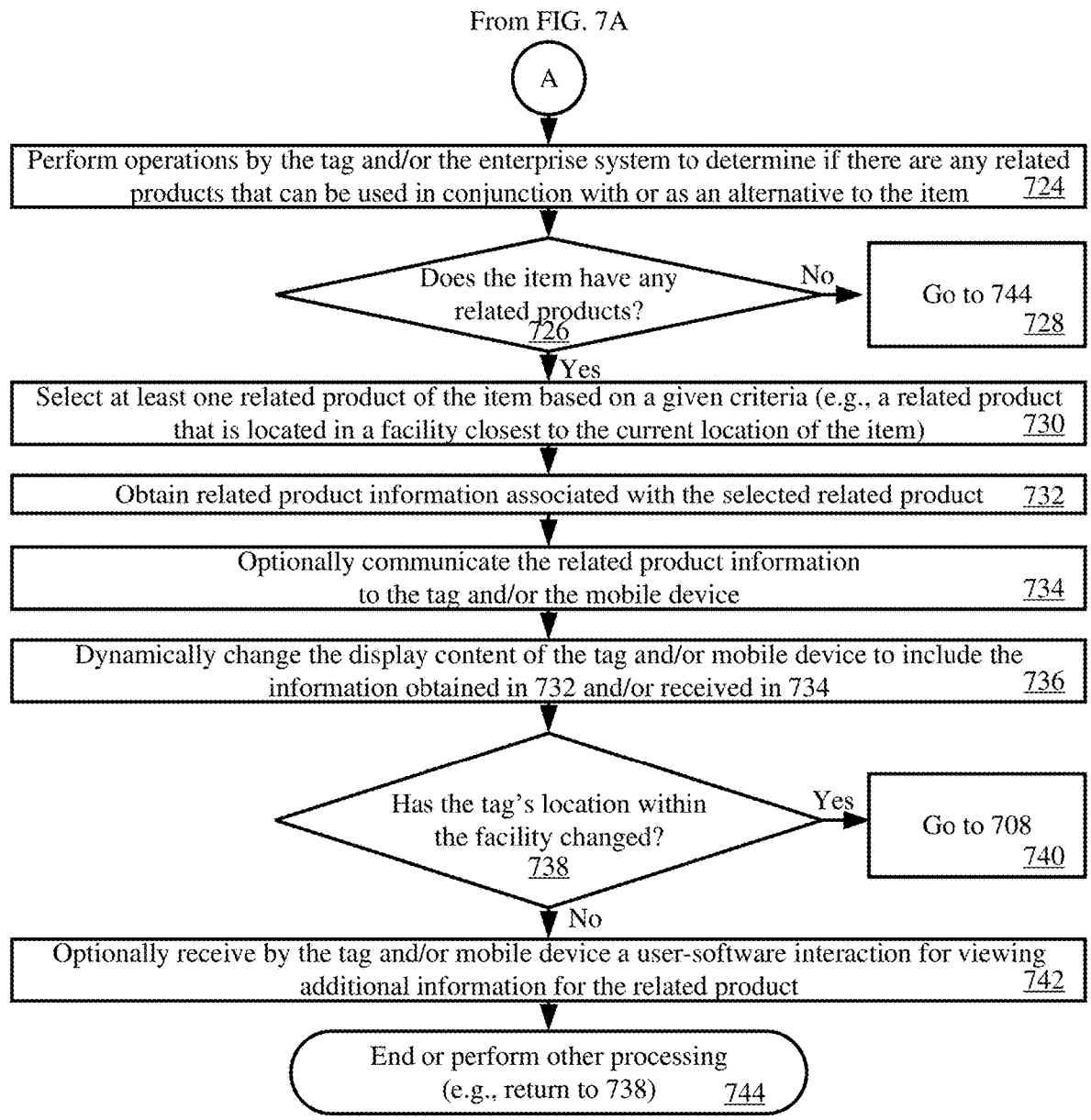

As shown in FIG. 7B, 724 involves performing operations by the tag and/or the enterprise system to determine if there are any related products that can be used in conjunction with or as an alternative to the item. An item/related products table (e.g., table 134 of FIG. 1) can be used in 724 to make the selection. This item/related products table can be stored in the tag's local memory (e.g., memory 308 of FIG. 3) and/or in a remote datastore (e.g., datastore 114 of FIG. 1). Accordingly, the determination can be made by the tag and/or a remote computing device (e.g., computing device 112 of FIG. 1). In some scenarios, the item/related products table comprises entries respectively associating item unique identifiers with related product unique identifiers. If at least one related product unique identifier is associated with the item's unique identifier in the item/related products table, then a determination is made that the item has a related product. In contrast, if there are no related product identifiers associated with the item's unique identifier in the item/related products table, then a determination is made that the item does not have any related products.

If the item does not have any related products [726:NO], then 728 is performed where method 700 continues with 744. In 744, method 700 ends or other processing is performed.

In contrast, if the item does have one or more related products [726:YES], then 730-744 are performed. 730 involves selecting at least one related product of the item based on a given criteria). For example, a related product is selected from a plurality of related products since it is located closest to the tag. The tag's current location, the item/related products table, and/or related product information (e.g., related product information 136 of FIG. 1) are used in this scenario to make the selection. The present solution is not limited in to the particulars of this example.

Related product information (e.g., related product information 136 of FIG. 1) associated with the selected related product is obtained in 732. 732 can involve obtaining related product information for the selected related product from a memory local to the tag (e.g., memory 308 of FIG. 3) and/or a remote datastore (e.g., datastore 114 of FIG. 1). Accordingly, the related product information can be communicated from the enterprise system to the tag and/or mobile device in some scenarios, as shown by optional 734. In other scenarios, the related product information is (a) first communicated to the tag, and then (b) communicated from the tag to the mobile device via an NFC or other type of communication. Next in 736, the displayed content of the tag and/or mobile device is dynamically changed to include the related product information for the selected related product.

Thereafter, the tag's location is monitored (e.g., by the tag's location module 330 of FIG. 3). If the tag's location within the facility has changed [738:YES], then 740 is performed where method 700 returns to 708. In contrast, if the tag's location within the facility has not changed [738: NO], then 742 is performed where the tag and/or mobile device optionally receives a user-software interaction for viewing additional information for the related product. In response to the user-software interaction, the tag and/or mobile device can obtain and display the additional information for the related product. The tag can obtain the additional information from a local memory (e.g., memory 308 of FIG. 3) and/or a remote datastore (e.g., datastore 114 of FIG. 1). The mobile device can obtain the additional information from the tag and/or from the remote datastore via a computing device of the enterprise system. Subsequently, 744 is performed where method 700 ends or other processing is performed (e.g., return to 738).

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim the following:

1. A method for dynamically changing displayed content of an electronic tag coupled to an item, comprising:
   using a sensor to detect when a first individual is in proximity to the electronic tag without the sensor making direct physical contact with the first individual;
   triggering operations of a computing device coupled to a communication network and remote from the electronic tag to obtain customer related information associated with the first individual of a plurality of different individuals for which customer related information is stored in a datastore, in response to a sensor data received from the sensor that the first individual is in proximity to the electronic tag;
   determining, by the computing device, a price discount for the item based on the customer related information which was previously obtained;
   determining, by the computing device, whether or not a second individual is in proximity to the electronic tag when the first individual is in proximity to the electronic tag;
   when a determination is made that there is a second individual in proximity to the electronic tag, performing the following operations:
      determining whether the first and second individuals are associated with a same customer account or same price discount;
      dynamically changing the displayed content of the electronic tag to include the price discount, responsive to a determination that the first and second individuals are associated with the same customer account or the same price discount; and
      respectively communicating different price discounts to mobile devices of the first and second individuals, responsive to a determination that the first and second individuals are not associated with the same customer account or the same price discounts.

2. The method according to claim 1, wherein the electronic tag comprises an Electronic Article Surveillance ("EAS") component.

3. The method according to claim 1, wherein the customer related information comprises a customer loyalty level for a rewards program offered by a business entity.

4. The method according to claim 1, further comprising:
communicating the price discount from the electronic tag to the mobile device of the first individual; and
outputting the price discount from the mobile device of the first individual.

5. The method according to claim 4, wherein the outputting comprises dynamically changing displayed content of the mobile device of the first individual to include the price discount.

6. The method according to claim 1, further comprising:
performing operations by the computing device to push item level information for the item to the mobile device of the first individual; and
outputting the item level information from the mobile device of the first individual.

7. The method according to claim 1, further comprising causing at least one of accessory information and related product information to be output from at least one of the electronic tag and the mobile device of the first individual.

8. The method according to claim 7, wherein the causing comprises:
identifying at least one first accessory for the item or at least one first related product that can be used in conjunction with or as an alternative to the item;
obtaining information for the identified at least one first accessory or related product that is to be presented to the first individual; and
dynamically changing the displayed content of at least one of the electronic tag and the mobile device of the first individual to include the information while the first individual is still in proximity to the electronic tag.

9. The method according to claim 8, further comprising selecting (a) the at least one first accessory from a plurality of accessories or (b) the at least one first related product from a plurality of related products based on the current location of the item and the locations of the accessories.

10. The method according to claim 8, further comprising:
monitoring the location of the electronic tag within a facility to detect when the physical location of the electronic tag changes; and
dynamically changing the displayed content to include information for at least one second accessory or related product that is physically located closest to the new physical location of the electronic tag.

11. The method of claim 1, further comprising receiving the sensor data from the proximity sensor, wherein the sensor is located on the electronic tag.

12. A system, comprising:
a processor comprising at least one of an electronic tag and a computing device remote from the electronic tag; and
a non-transitory computer-readable storage medium comprising programming instructions that are configured to cause the processor to implement a method for dynamically changing displayed content of the electronic tag coupled to an item, wherein the programming instructions comprise instructions to:
use a sensor to detect when a first individual is in proximity to the electronic tag without the sensor making direct contact with the first individual;
trigger operations to obtain customer related information associated with the first individual of a plurality of different individuals for which customer related information is stored in a datastore, in response to sensor data received from the sensor that the first individual is in proximity to the electronic tag;
determine a price discount for the item based on the customer related information which was previously obtained;
determine whether or not a second individual is in proximity to the electronic tag when the first individual is in proximity to the electronic tag;
when a determination is made that there is a second individual in proximity to the tag, performing the following operations:
determining whether the first and second individuals are associated with a same customer account or same price discount;
dynamically causing the displayed content of the electronic tag to change so as to include the price discount, responsive to a determination that the first and second individuals are associated with the same customer account or the same price discount; and
respectively communicating different price discounts to mobile devices of the first and second individuals, responsive to a determination that the first and second individuals are not associated with the same customer account or the same price discounts.

13. The system according to claim 12, wherein the electronic tag comprises an Electronic Article Surveillance ("EAS") component.

14. The system according to claim 12, wherein the customer related information comprises a customer loyalty level for a rewards program offered by a business entity.

15. The system according to claim 12, wherein the programming instructions further comprise instructions to cause the price discount to be output from the mobile device of the first individual.

16. The system according to claim 15, wherein the displayed content of the mobile device of the first individual is dynamically changed to include the price discount.

17. The system according to claim 12, wherein the programming instructions further comprise instructions to cause the item level information to be output from the mobile device of the first individual.

18. The system according to claim 12, wherein the programming instructions further comprise instructions to cause at least one of accessory information and related product information to be output from at least one of the electronic tag and the mobile device of the first individual.

19. The system according to claim 12, wherein the programming instructions further comprise instructions to:
identify at least one first accessory for the item or at least one first related product that can be used in conjunction with or as an alternative to the item;
obtain information for the identified at least one first accessory or related product that is to be presented to the first individual; and
cause the displayed content of at least one of the electronic tag and the mobile device of the first individual to be dynamically changed so as to include the information while the individual is still in proximity to the electronic tag.

20. The system according to claim 19, wherein the programming instructions further comprise instructions to select (a) the at least one first accessory from a plurality of accessories or (b) the at least one first related product from a plurality of related products based on the current location of the item and the locations of the accessories.

21. The system according to claim 19, wherein the programming instructions further comprise instructions to:

monitor the location of the electronic tag within a facility to detect when the physical location changes; and cause the displayed content of the electronic tag to change so as to include information for at least one second accessory or related product that is physically located closest to the new physical location of the electronic tag.

\* \* \* \* \*